United States Patent [19]

Williams

[11] Patent Number: 4,634,061

[45] Date of Patent: Jan. 6, 1987

[54] METHOD AND APPARATUS FOR GRINDING KERNELS OF GRAIN, COFFEE BEANS, AND THE LIKE IN A FOOD PROCESSOR

[75] Inventor: James E. Williams, Stamford, Conn.

[73] Assignee: Cuisinarts, Inc., Greenwich, Conn.

[21] Appl. No.: 743,788

[22] Filed: Jun. 12, 1985

[51] Int. Cl.$^4$ ............................................. B02C 18/00
[52] U.S. Cl. .......................... 241/101 R; 241/257 R; 241/259.1; 241/261.1
[58] Field of Search ................... 241/92, 282.1, 282.2, 241/246, 248, 261.1, 259.1, 162, 259.2, 199.12, 30, 257 R, 101 R

[56] References Cited

U.S. PATENT DOCUMENTS

| | | | |
|---|---|---|---|
| 2,159,670 | 5/1939 | Neitzke | 241/261.1 X |
| 2,963,232 | 12/1960 | Smith | 241/162 X |
| 3,892,365 | 7/1975 | Verdun | 241/92 |
| 3,952,958 | 4/1976 | Rich | 241/162 |
| 3,985,304 | 10/1976 | Sontheimer | 241/92 |
| 4,135,672 | 1/1979 | Schlessel | 241/261.1 X |
| 4,198,887 | 4/1980 | Williams, Jr. | 83/356.3 |
| 4,200,244 | 4/1980 | Sontheimer | 241/282.1 |
| 4,213,570 | 7/1980 | Jones | 241/38 |
| 4,216,917 | 8/1980 | Clare et al. | 241/37.5 |
| 4,226,373 | 10/1980 | Williams | 241/37.5 |
| 4,227,655 | 10/1980 | Williams | 241/92 |
| 4,277,995 | 7/1981 | Sontheimer | 83/150 |

Primary Examiner—Mark Rosenbaum
Attorney, Agent, or Firm—Parmelee, Bollinger & Bramblett

[57] ABSTRACT

Method and apparatus for quickly and effectively grinding kernels of grain, such as wheat or corn, coffee beans, and the like, in a food processor producing a finely divided or flour-like consistency food product or condiment. Nutritious home-ground whole-grain flour can be conveniently and quickly made. The kernels, grains, beans, or other food products to be ground are introduced into a hopper positioned above the bowl of the food processor and located above a grinder assembly including a downwardly converging then diverging stator grinding member which encircles a rapidly rotating rotor grinding member having a vertical axis of rotation and being positioned within the stator member. This rotor grinding member is coupled to the vertical tool shaft of the food processor which extends up into the bowl. The separation between stator and rotor grinding members is manually adjustable and settable by a hand knob located above the grinder assembly for controlling the consistency and fineness of the ground product, which is deposited from the grinder assembly into the bowl. The illustrated grinder attachment for a food processor may be conveniently operated, adjusted, controlled and cleaned in a safe, efficient manner utilizing without alteration the basic components of the food processor, namely the motor drive, safety interlock system, as well as the bowl.

27 Claims, 8 Drawing Figures

METHOD AND APPARATUS FOR GRINDING KERNELS OF GRAIN, COFFEE BEANS, AND THE LIKE IN A FOOD PROCESSOR

BACKGROUND OF THE INVENTION

This invention relates to a grinding method and apparatus embodied as an attachment to an existing electrical appliance with a motor drive, such as a food processor base and bowl, for quickly and effectively grinding and processing grains, such as wheat or corn, coffee beans and the like into finely-divided or flour-like food products which are deposited in the bowl. For example, nutritious home-ground whole-grain flour can be quickly and conveniently made.

Food processors are extremely useful and efficient kitchen appliances which are capable of providing a large variety of food processing functions which save time. They are capable of processing large quantities of food in a relatively short time and allow the preparation of elaborate as well as simple recipes which are appetizing and appealing.

The illustrative embodiment of the present invention is employed as an attachment to food processors of the type having a working bowl with motor-driven tool drive means extending into the bowl with which various selected rotary food processing tools can be engaged to be driven for performing various food processing operations in accordance with the desires of the user. A removable cover is secured over the top of the bowl during use. The cover includes a feedtube having a passageway which opens downwardly through the cover into the bowl, and the food items to be processed are placed in the feedtube and then pushed down into the bowl by means of a removable food pusher which is adapted to slide down in the manner of a plunger in the feedtube. The food items are sliced, grated or otherwise processed by the rotary tool in the bowl. The bowl carries on its periphery a push rod which forms a part of a safety interlock system for allowing engaging of the motor drive for driving the tool drive means only when the bowl and the cover are properly positioned on the food processor.

Additional information with respect to such food processors may be obtained by reference to U.S. Pat. Nos. 3,892,365; 3,985,304; 4,198,887; 4,200,244; 4,213,570; 4,216,917; 4,226,373; 4,227,655; and 4,277,995.

A continuing interest in health and diet has added an ever increasing variety of separate, individualized, complete appliances for performing a specialized or a very limited number of functions for example, such as coffee grinders, juicers, blenders, mixers, etc. The accumulation of these complete appliances, whose functions somewhat overlap, is costly as well as requiring additional storage space in cabinets and on counter tops. Such counter space and storage facilities are already crowded in most home kitchens.

SUMMARY OF THE INVENTION

Accordingly, it is an object of this invention to providing grinding method and apparatus embodied as an attachment for a food processor which can be mounted on the bowl and base of a food processor and which employs the motor drive and the existing controls of the food processor.

A further object of this invention is to provide a grinder attachment for a food processor which is compact, efficient; adjustable, fast-acting and attractive.

Still another object of this invention is to provide a grinder attachment for a food processor which employs and enjoys all of the safety interlock features which are presently utilized in food processors to prevent damage or injury to the machine or the user.

Still another object of this invention is to provide a new and improved grinder attachment for a food processor which also utilizes the bowl of the food processor and may be employed for grinding or pulverizing a large variety of granular or kernel foods for example, such as grains, coffee beans, condiments and the like.

A still further object of this invention is to provide a new and improved grinder attachment for a food processor which is manually adjustable and settable for producing different grinds and various desired finenesses in the output from the grinding operation.

It is among the many advantages of this invention that it provides a grinder attachment which may be easily and safely attached to and disengaged from the tool drive means of a food processor, and which is convenient and easy to mount and adjust in operating position and to utilize.

As used herein the term "dry particulate food" is intended to have a generic meaning including foodstuffs and condiments in their various forms of kernels, grains, beans, seeds and dried particles suitable for grinding including, but not limited to, wheat, rye, oats, buckwheat, barley, corn, coffee beans, dried nuts, condiments.

Among the further advantages flowing from the present invention are those resulting from the fact that the illustrated grinder attachment is so effective, convenient and easy to use that many consumers will be encouraged to make at home and to use freshly-ground, whole-grain flour with consequent nutritional benefits.

In carrying out this invention in one illustrative embodiment thereof, grinding apparatus is adapted to be mounted as an attachment on the bowl of a food processor having a base containing a motor drive and a vertical tool shaft extending up into the bowl and rotatable by the motor drive. The grinding apparatus includes a grinding assembly having a stator grinding member and a rotor grinding member located within the stator which grinding assembly is adapted to be positioned in the bowl. Means are provided for removably coupling the rotor grinding member to the vertical tool shaft for rotation thereby. The grinder attachment as a whole is mountable like a cover on the rim of the bowl and has a hopper on top for directing particulate food to be ground into the region between the stator and rotor grinding members of the grinding assembly, whereby the particulate food is ground in the grinding assembly and deposited in the bowl of the food processor. The means for removably coupling the rotor member to the vertical tool drive shaft is adjustable in the axial direction for varying the spacing between the rotor and stator of the grinding assembly, thereby providing an adjustment in the fineness of the product being ground. The stator is mounted on the lower end of the hopper, and the grinder assembly will not operate unless the bowl and the grinder attachment are both properly positioned in operating relationship in order to actuate the safety interlock system of the food processor for enabling the motor drive to be operated for driving the grinding assembly.

Accordingly, it is among the many advantages of this invention that an uncomplicated but fast-acting, adjustable and efficient grinder attachment is provided which may be readily mounted on the bowl of a conventional food procesor without any alteration whatsoever in the bowl or base of that processor. Since the grinder attachment as a whole, incorporating the hopper and the grinder assembly, must be properly positioned on the bowl in the manner of a cover before the grinding assembly will operate, the operator is protected from access to the rotating parts of the machine during use.

BRIEF DESCRIPTION OF THE DRAWINGS

The invention, together with further objects, features, and advantages thereof will be more fully understood from a consideration of the following description taken in conjunction with the accompanying drawings in which like elements are designated with the same reference numerals throughout the various views. Also, the various elements are not necessarily illustrated to scale in order to enhance understanding and more clearly show and describe the invention.

DESCRIPTION OF THE PREFERRED EMBODIMENTS

Figure 1:
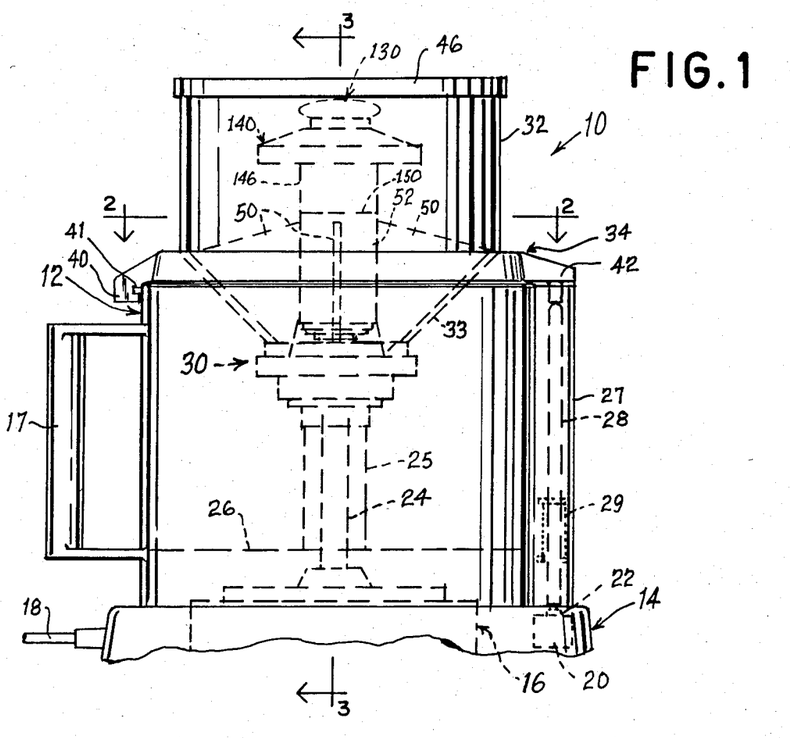
FIG. 1 is a side elevational view of the grinding apparatus of the present invention embodied as an attachment shown mounted in operative position on a bowl positioned for operation on the base (partially shown) of a food processor.

Referring now to FIG. 1, the grinder attachment mounted on the bowl of a food processor is referred to generally by the reference numeral 10. This grinder attachment 10 is shown operatively positioned on a working bowl 12 having a handle 17. This bowl is positioned on a base 14, partially shown, of a food processor of the type described in the patents referred to above in the introduction. The bowl has a skirt 11 (FIG.3) which seats down around a turret portion 15 on the base housing 14. The base housing 14 contains. an electric motor drive 16 which is energized by an electric power cord 18 via a switch 20 having actuating means shown as a button 22. Extending vertically up from the base 14 is rotary tool drive means 24 in the form of a vertical tool drive shaft which is driven by the drive means 16. This tool drive shaft 24 extends upward within an annular well 25 which is integral with the bottom 26 of the bowl. As is more fully explained in the aforesaid patents, a plurality of different kinds of food processing tools may be provided which may be selectively mounted on the drive shaft 24 for rotation within the bowl to perform a variety of food processing functions.

In accordance with the present invention, grinding apparatus 30 comprising components of the attachment 10 are coupled to this drive shaft 24 and are driven thereby. Thus, advantageously, the usage of this grinder attachment 10 does not require any modification of the existing base housing 14, the motor drive 16, the tool drive shaft 24 or the bowl 12.

Formed on the side of the bowl 12 is a vertical semi-cylindrical boss 27 defining a guideway within which is carried a vertically movable actuating rod 28 which is normally urged upwardly by means of a spring 29. When the bowl 12 is properly positioned upon the base housing 14 in operating position, then the actuating rod 28 becomes aligned with the actuating means 22 of the switch 20, being separated therefrom by means of a flexible, fluid-tight membrane in the base 14.

Figure 3:
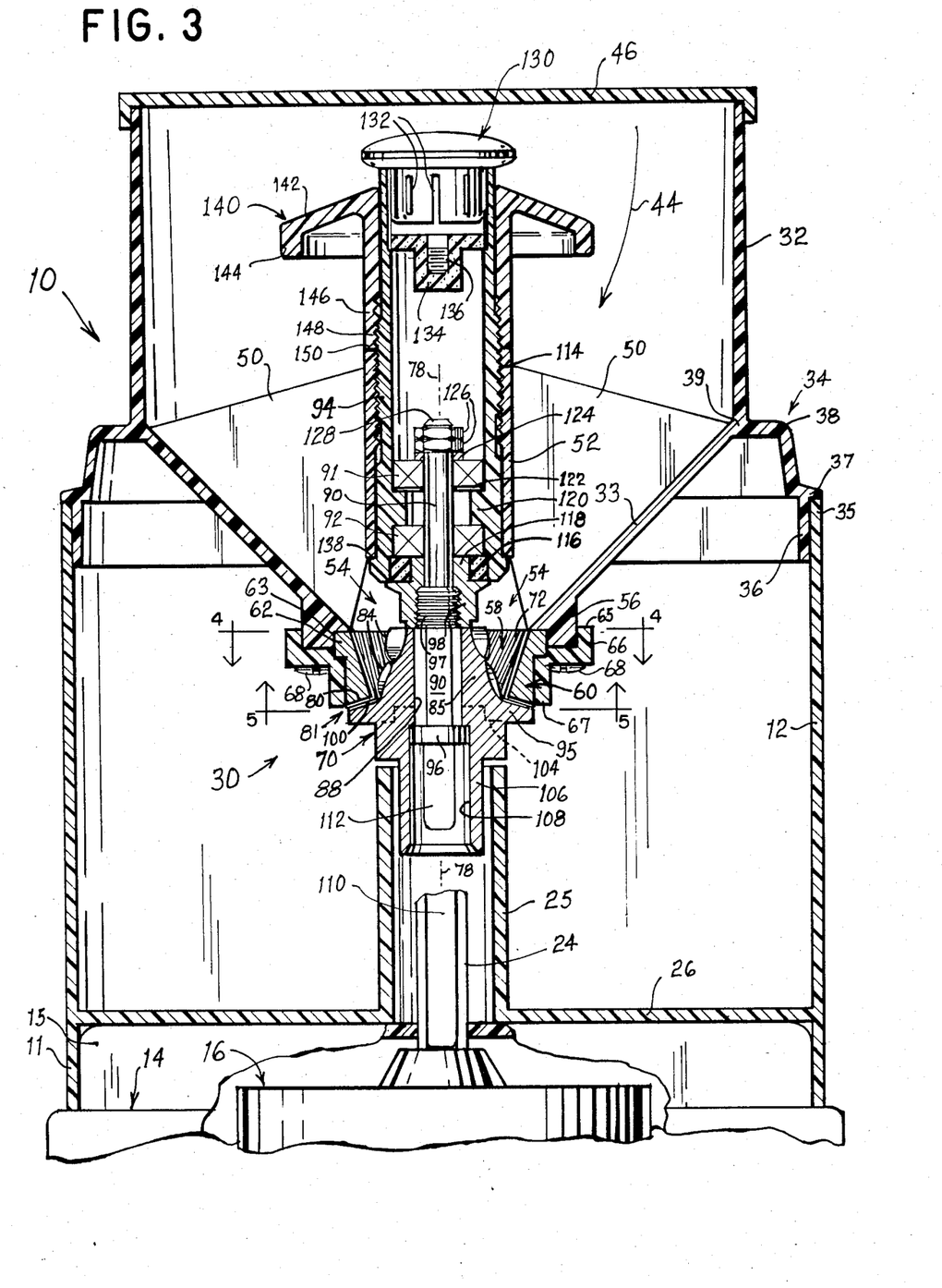
FIG. 3 is an enlarged elevational sectional view, taken along the line 3—3 of FIG. 1.

The grinding attachment 10, as seen in FIGS. 1 and 3, includes the grinding apparatus 30, a circular cylindrical hopper 32 positioned directly above this grinding apparatus and a downwardly and inwardly converging truncated conical bottom portion 33 of the hopper which serves as a funnel chute for gravity feeding of particulate food from the hopper down into the grinding apparatus 30. Encircling the hopper 32, 33 is a mounting skirt 34 having a downwardly extending vertical cylindrical lip 36 (FIG.3) which fits snuggly within the rim 35 of the bowl 12 and a radially extending horizontal flange 37 which seats on top of the bowl rim 35. This mounting skirt 34 includes a rounded annular shoulder 38 which is formed integral with the wall of the hopper at the juncture 39 of its cylindrical and conical portions 32 and 33, respectively.

Thus, the top of the working bowl 12 is effectively covered over by the hopper 32, 33 and its mounting skirt 34 during operation, so that the user does not have direct access to the rotating parts to be described later which are located within the bowl. The peripheral mounting skirt 34 of the grinder attachment 10 is arranged to be engaged in locked relationship in its normal operating position on the bowl 12 whenever the grinding apparatus 30 is being driven by the motor drive 16 and its tool drive shaft 24. For example, this mounting skirt 34 may be held in locked engagement on the bowl 12 by placing the mounting skirt 34 onto the rim 35 of the bowl and then partially rotating the whole attachment 10 to obtain a twist-lock effect. For this locking engagement, the mounting skirt 34 is shown to carry a plurality of circumferentially located depending lugs 40 (FIG. 1) which, upon slightly turning the attachment 10, become engaged beneath cooperating radial ledges 41 on the bowl 12 near its rim 35. It will be appreciate that the mounting skirt 34 may be secured in place in locking engagement on the rim of the bowl by any form of suitable manually engageable fastening means.

The mounting skirt 34 includes a camming structure 42 which engages and pushes down the actuating rod 28 when the mounting skirt 34 has been positioned in its normal secured operating position on the bowl 12. The camming structure 42 may be of the type more fully described in the aforesaid patents, and it may be of any type which pushes the actuating rod 28 downwardly, when the attachment 10 is appropriately mounted in secured operating position on the bowl 12. The rod 28 in turn pushes down the actuating means 22 for closing the switch 20, which thereby enables the motor drive 16 to be energized upon manual operation of the controls (not shown) on the base housing 14 for rotating the vertical drive shaft 24. The described actuation of the interlock switch 20 which occurs by means of the correct positioning of the bowl 12 and of the grinder attachment 10 on the bowl 12 is intended as a safety feature for preventing rotation of the tool drive shaft 24 unless the user has properly positioned the bowl and grinder attachment.

Figure 2:
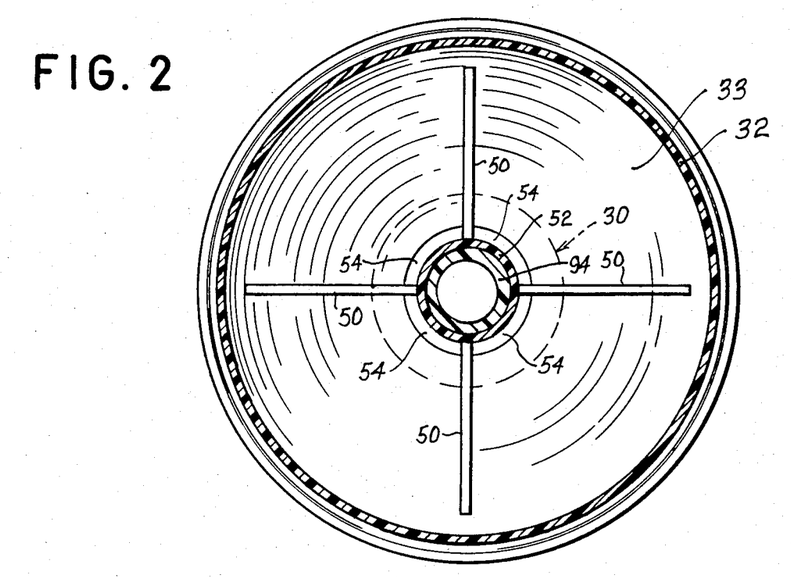
FIG. 2 is an enlarged sectional view of the hopper and adjustment means, as seen taken along line 2—2 in FIG. 1 looking down.

The hopper 32, 33 forms a passageway 44 (FIG. 3) for feeding particulate foods, which are to be ground, to the grinding apparatus 30, as will be explained in detail later. There is a removable cover 46 which may be placed over the cylindrical portion 32 of the hopper. The hopper 32, 33 contains a plurality of radial strengthening and support ribs 50 (please see also FIG. 2) for example four ribs in quadrature which extend from a central tubular support 52 to the truncated conical chute 33. There are four openings 54 (FIGS. 2 and 3) between these quadrature ribs 50 at the lower end of the conical chute 33. These openings 54 are located below the lower end of the tubular central support 52 and serve to feed the particulate food down from the hopper chute 33 to the grinder apparatus 30. The conical chute 33 is terminated at its lower end in an integral pedestal 56 (FIG. 3) which functions as the mounting to carry a stator member of the grinding apparatus 30, as will now be explained.

Figures 4, 6:
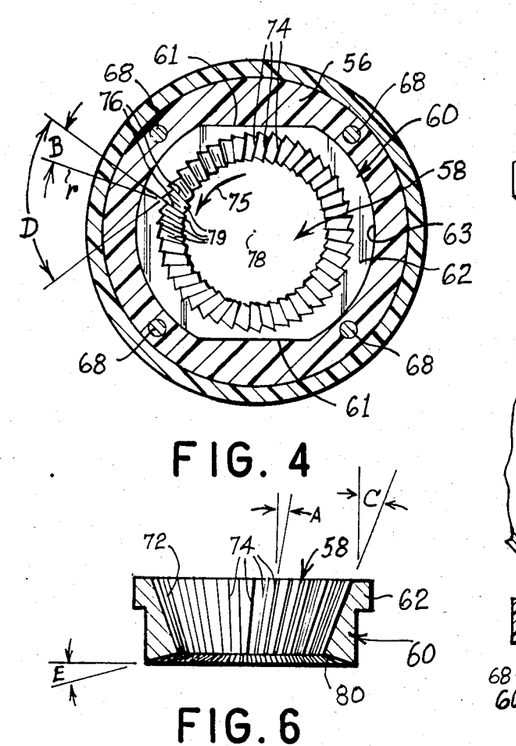
FIG. 4 is a plan cross-sectional view taken along line 4—4 of FIG. 3 looking down, showing the throat of the stator grinding member and its mounting on the lower end of the hopper.
FIG. 6 is an elevational sectional view of the stator grinding member, being a section taken along the line 6—6 in FIG. 5.
Figure 5:
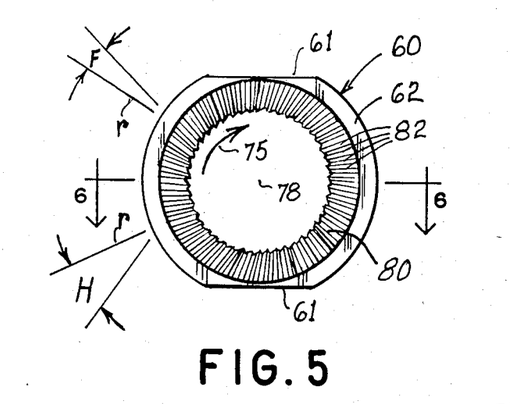
FIG. 5 is a view taken along line 5—5 of the FIG. 3 looking upward, showing the underside of the stator grinding member.

The grinding assembly apparatus 30 includes a stator grinding member 60 in the form of a hardened stationary annular grinder as is most clearly shown in FIGS. 4, 5 and 6. This stator grinding member 60 has a central throat opening 58 therein and has an upper mounting flange 62 thereon. On its lower surface, this stator member 60 has a flaired grinding surface 80. As will best be seen in FIGS. 3 and 4, the stator grinding element 60 is held on the pedestal 56 of the hopper chute 33 by a retaining ring collar 66 attached by a plurality of machine screws 68 which screw into threaded holes in the pedestal 56.

In order to secure the stator grinding member 60 firmly in place, its mounting flange 62 has a pair of diametrically opposed, parallel flattened regions 61 (FIGS. 4 and 5). The pedestal 56 defines a socket 63 (FIGS. 3 and 4) which receives the mounting flange 62 in tight fitting relationship, and this socket 63 has a pair of opposed, parallel flat regions (as seen in FIG. 4) which snuggly mate with the flats 61 for preventing the stator grinding member 60 from shifting position or from turning in its socket 63. The retainer ring collar 66 has an upstanding ring 65, as seen in FIG. 3, which encircles the pedestal 56 so that this ring collar 66 defines a socket embracing the lower portion of the pedestal and also embracing the lower portion of the flange 62 of the stator grinding member. This retainer ring collar 66 has a cylindrical lower portion 67 which encircles the stator grinding member 60 in tight-fitting relationship for holding this stator grinding member securely in place accurately concentrically aligned with the vertical axis of rotation of a rotor grinding member 70 to be described in detail later.

As seen most clearly in FIGS. 4 and 6, the throat opening 58 in the stator member 60 is downwardly converging with its truncated conical serrated wall 72 slanting inwardly at a small acute angle "C", for example at an angle "C" of about 15° to the vertical. This serrated wall 72 includes between 35 and 50 saw-tooth shaped serrations 74, which cooperate with the rotor 70, to be described later, for feeding the particulate food down, while shearing and cracking and commencing to grind it. In this illustrative embodiment there are 45 of these saw-tooth shape serration ridges 74. Shown by the arrow 75 in FIG. 4, the rotor 70 turns in a counterclockwise direction as seen looking downwardly. The saw-tooth shaped ridges 74 each has an abrupt front face 76 (FIG. 4) facing toward the oncoming particulate food as driven by the impelling rotor 70, i.e., facing in the clockwise direction opposite to the rotation 75. Each abrupt face 76 is inclined at a small acute angle "B" (FIG. 4) to a radial line "r" extended from the vertical axis of rotation 78 of the rotor, for example at an angle "B" of about 15°. Also each abrupt face 76 slopes downward in the counterclockwise direction at a small acute angle "A" (FIG. 6) with respect to the vertical, for example at an angle "A" of about 5°, for cooperating with the rotor 70 in providing a downward component of force on the particulate food in the converging throat feeding-shearing-cracking-grinding zone 58.

The saw-tooth shaped ridges 74 each have a more gradually sloping rear surface 79 facing away from the oncoming particulate food, that is, the rear face 76 faces generally in the counterclockwise direction 75. Each ridge 74 has a sharp V-shaped apex between its front and rear faces 76 and 79, respectively, and each ridge also has a sharp V-shaped groove between its front face 76 and the rear face 79 of the preceding adjacent ridge. Each V-shaped groove forms an acute angle "D" as seen in FIG. 4 at the top surface of the stator grinding member 60, for example, angle "D" in the range from about 60° to about 80°, with the preferred value being about 75°. When the angle of these grooves is less than about 60° they become unduly deep in the radial direction, thereby forming channels tending to protect the particulate food from the desired shearing/cracking and grinding action between stator 60 and rotor 70. Conversely, when the angle "D" of these grooves is greater than about 80°, they become unduly shallow in the radial direction, and consequently each saw-tooth shaped ridge 74 has insufficient frontal area 76 "bite" for producing the desired shearing/cracking action on the particulate food between stator 60 and rotor 70. This stator 60 is made of stainless steel which is machined and then heat treated to produce a high degree of hardness.

The inner surface of the funnel chute 33 (FIGS. 3 and 7) is directly contiguous with the bottom of each groove between the saw-tooth shaped ridges 74 for rapidly feeding particulate food into the feeding-shearing/cracking-grinding zone 58 between stator 60 and rotor 70.

The stator 60 includes a downwardly facing flared grinding surface 80 extending radially outwardly and sloping downwardly which includes numerous grinding serrations 82 each having a saw-tooth shaped ridge configuration extending generally radially outwardly for providing a second grinding zone 81 (FIG. 3). For example, this grinding surface 80 slopes downwardly at an angle "E" to the horizontal in the range from about 5° to about 40°, with the presently preferred value for "E" being about 10° to about 15°. These saw-tooth shaped grinding ridges 82 are similar in shape to those ridges 74 previously described, having abrupt front faces and more gradually sloping rear surfaces except that ridges 82 are considerably smaller and more numerous, for example there are between twice and three times as many of the ridges 82. In this illustrative embodiment there are 120 of these grinding ridges 82.

As seen in FIG. 5, looking upward, the direction of rotation 75 of the rotor about its vertical axis 78 is clockwise. The grinding ridges 82 are inclined outward in the clockwise direction as seen looking upwardly in FIG. 5 at a small acute angle "F" with respect to a radial line "r" extended from the axis of rotation 78, for example angle "F" is in the range from about 10° to about 30°, preferably being about 15°, to cooperate with the rotor in providing a component of force acting outwardly away from the axis 78 on the particulate food being ground.

In order to feed the particulate food down into the first zone 58 there is a downwardly and outwardly sloping truncated conical shape feeder and grinder section 85 (FIG. 3) of the rotor 70 made of hardened stainless steel like that from which the stator 60 is made. This rotor 70 includes a plurality of serrations, for example four, helical flutes 84 as seen most clearly in FIGS. 7 and 8, which have a right hand screw twist as seen from above for feeding the particulate food downwardly. For example, these helical flutes 84 are inclined at a screw pitch angle "G" (FIG. 7) of less than about 40° and more than about 15° to the horizontal, preferably angle "G" being about 30°. These helical flutes 84 each have an abrupt radially extending somewhat cupped front surface 86 (FIG. 8) in order to catch onto and claw into the particulate food for pushing/feeding the particulate food downwardly in the first shearing/cracking and grinding zone 58.

For its mounting, the rotor 70 has a bore 88 (FIG.8) in positive drive relationship with a shaft 90 (FIG. 3) rotatably mounted in a pair of axially spaced ball bearing units 91 and 92 seated in an adjustable tubular housing 94. This shaft 90 has a head 96 (FIG. 3) engaging an internal shoulder in the bore of the rotor 70. Above this head 96 there is a hexagonal section of the shaft 90 mating with the hexagonal portion 88 (FIG. 8) of the bore of the rotor 70. Then, above this hexagonal section, the shaft 90 has a screw thread section 97 engaged by a shouldered retainer nut 98 which is screwed down tightly onto the rotor 70 for securely holding the rotor down against the shaft head 96.

In addition to the feeding and cracking and grinding section 85 (FIG. 3) of the rotor 70, this rotor also includes a second grinding section 95 which flares outwardly like a skirt and has an upwardly facing truncated conical rotor grinding surface 100 (FIGS. 3 and 7) positioned in opposition to the downwardly facing truncated conical stator grinding surface 80, thereby defining the second grinding zone 81 between these opposed grinding surfaces 100 and 80. This rotor grinding surface 100 extends radially outwardly and slopes downwardly at about the same angle "E" as the stator grinding surface 80 thus being effectively parallel thereto, and includes about the same number of grinding serrations 102 of about the same saw-tooth shape ridge configuration as the serration 82. In other words, these saw-tooth shape grinding ridges 102 have abrupt front faces and more gradually sloping rear surfaces. In order to cooperate with the stator ridges 82 for providing a component of force acting outwardly away from the axis of rotation 78, these rotor ridges 102 are inclined outward in the counterclockwise direction as seen looking upward in FIG. 5 at an angle "H" with respect to a radial line "r" in the range from about 20° to about 50°, preferably being about 30°. Thus, the sum of grinding serration angles "F" and "H" of the opposed ridges 82 and 102 is in the range from about 35° to about 50°, preferably being about 45°. If the clockwise radial inclination "F" of the grinding ridges 82 is decreased, then the counterclockwise radial inclination "H" of the grinding ridges 102 is increased for keeping their sum in the range from about 35° to about 50° and preferably at about 45°, which I have found to work to advantage in rapidly and uniformly grinding a wide variety of particulate foods as described in the introduction.

Although the rotor 70 is shown as a one-piece high hardness, stainless steel unit, its feeder-shearer/cracker-grinder section 85 and its second grinder section 95 may be fabricated as two separate highly hardened stainless steel pieces having a mating joint 104 between them as shown dashed in FIG. 3. They then rotate the same as an integral unit, because they are coupled together in positive drive relationship by the hexagonal section of the shaft 90 and by their mating joint 104.

In order to drive the rotor 70 by means of the tool drive shaft 24 (FIG. 3) the rotor includes a downwardly projecting socket portion 106 which extends down into the annular well 25 and has a socket 108 concentric with its axis 78 and which removably engages the shaft 24 in positive drive relationship. For example, this socket 108 may be keyed or splined to the tool drive shaft 24, for example there are a pair of opposed flats 110 (only one is seen in FIG. 3) on the tool drive shaft which mate with a corresponding pair of opposed flats 112 (only one is seen) in the socket 108. For clarity of illustration of the socket 108, the upper end of the tool drive shaft 24 is shown broken away in FIG. 3, it being understood that this shaft 110 actually extends well up into socket 108, for example almost up to the head 96 of the rotor mounting shaft 90.

The support arrangement of a seal and of the ball bearing units 91 and 92 for the rotor mounting shaft 90 will now be described. The shouldered retainer nut 98 carries an annular seal 116 (FIGS. 3 and 7) on its upwardly facing shoulder, and this seal 116 fits into the lower end of the tubular bearing housing 94 with sufficient clearance for allowing the shaft 90 and nut 98 to rotate, while the tubular housing 94 remains stationary. In order to apply axial preloading on the bearing units 91 and 92, there is a boss 118 on the retainer nut 98 which thrusts upwardly against the inner race of the ball bearing unit 92, while the outer race of this bearing unit 92 is thrust downwardly by seating up against an annular shoulder 120 within the tubular housing 94. An axial thrust wave washer 122 is sandwiched between the annular shoulder 120 and the outer race of the upper bearing unit 91. A washer 124 is held by a pair of lock nuts 126 screwed onto the threaded top end 128 of the shaft 90. This washer 124 is thrust downwardly by the lock nuts 126 against the inner race of the upper bearing unit 91, while the wave washer 122 thrusts upwardly against its outer race. Thus, these two bearing units 91 and 92 run smoothly without chatter at the normal operating speed of about 1725 to 1750 RPM of the food processor tool drive shaft 24 by virtue of the axial preloading in opposite directions of their respective inner and outer races provided by this bearing mounting arrangement just described.

For controlling the fineness of the ground food products, the grinding clearance spacing is adjustable between the opposed grinding surfaces 80 and 100 in the second grinding zone 81. The tubular housing 94 is conveniently manually axially adjusted in position relative to the tubular support 52. This housing 94 has an externally screw-threaded section at 114 engaging a corresponding internally screw-threaded section within the tubular bearing support 52. The upper end of this tubular bearing housing 94 has a knob handle 130 which is keyed to the bore of the housing 94 by a plurality of splines 132. This handle knob 130 carries a seal 134 attached by a threaded stud 136 to its lower surface. It will be understood that this knob 130 is removed during assembly of the bearing mounting arrangement for the rotatable shaft 90, and it may be cemented in place, if desired, after assembly. The seals 116 and 136 protect the ball bearing units 91 and 92 from entry of foreign substances, and they retain lubrication within the tubular housing 94 for these bearings.

Figure 7:
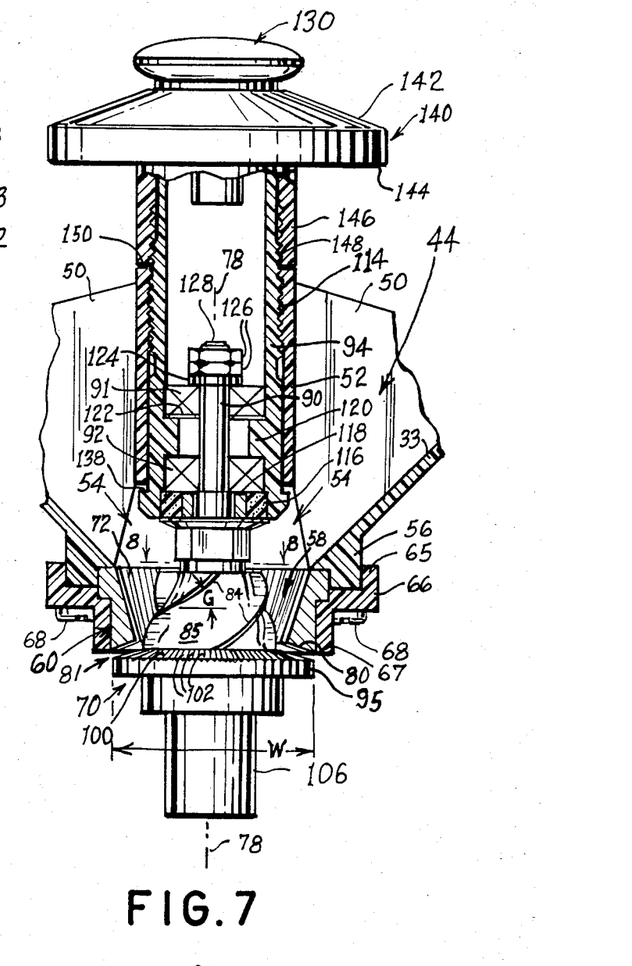
FIG. 7 is an elevational sectional view similar to portions of FIG. 3, except that the rotor grinding member is seen in elevation, and the spacing between the rotor and stator grinding members has been increased by manual adjustment in the axial direction, as compared to their spacing in FIG. 3.
Figure 8:
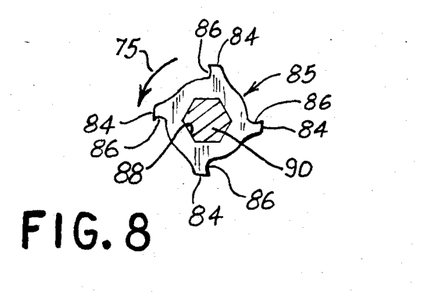
FIG. 8 is a partial sectional view to show the shape of the top surface of the rotor feeding helical fluted member, being a view taken along line 8—8 in FIG. 7.

The user turns the handle knob 130 for turning the housing 94 relative to its tubular support 52 for axially adjusting the housing 94 for adjusting the grinding clearance in the second zone 81 for regulating the fineness of the ground food particles or flour being produced. An external shoulder stop 138 on the housing 94 abuts against the lower end of the tubular support 52, as shown in FIG. 3, for establishing the minimum grinding clearance adjustment in the zone 81 for assuring that the opposed grinding surfaces 100 and 80 do not clash against each other when the user adjusts for minimum clearance to produce fine flour. In FIG. 7, the housing 94 has been adjusted downwardly by turning the knob 130, and thus the shoulder stop 138 is now spaced from the lower end of tubular support 52, and consequently there is more clearance between the opposed grinding surfaces 80 and 100 in the zone 81. The ground food product will be less fine than with the minimum setting in FIG. 3.

In order to lock firmly the adjusted position of the housing 94, there is a hand-turned locking member 140 including a wheel-shaped handle 142 having a rim 144. This locking member 140 has a tubular bottom portion 146 which is screw-threaded at 148 onto the upper portion of the threaded section 114 of the housing 94. The user turns this locking handle 140 in the manner of a large lock nut for jamming its tubular bottom portion 146 down tightly against the upper end 150 of the tubular support 52 thus locking the housing 94 against moving away from its adjusted position. The user loosens the locking handle 140 before turning the adjustment knob 130. After the desired fineness of grinding adjustment has been made by turning the knob 130, then the locking handle 140 is again tightened down for locking and holding the new adjustment. During such axial adjustment, the socket 108 slides upwardly or downwardly along the tool drive shaft 24 for accommodating the slight change in axial position of the rotor grinding member 70.

The hopper 32, 33, the radial support ribs 50, the tubular support 52, the ring retainer collar 66, and the tubular bearing housing 94 are preferably made of clear, transparent, strong, rugged, rigid plastic material, for example such as polycarbonate. The hand knobs 130 and 140 are preferably made from transluscent, milky plastic for example, such as Nylon polyamide or Delrin acetal resin.

Cleaning of the whole attachment 10 is convenient by removing it from the bowl 12 and flushing water down through the hopper bottom openings 54.

It is to be noted that in defining the first grinding zone 58 the stator surface 72 slopes downardly and inwardly and the opposed coaxial inner surface 85 slopes downwardly and outwardly, thus defining substantially a vertical path for maximizing the downward feeding effect of gravity for aiding the helical flutes in propelling the particulate food downwardly through this first zone 58. Conversely, the second grinding zone 81 defines generally a more horizontal rather than vertical path. This more generally horizontal zone 81 flares outwardly at more than an angular difference of 50° from the first vertical zone 58 for enabling relatively small adjustments in the relative axial position of the stator and rotor grinding means to effect significant changes in the clearance between the opposed grinding surfaces 80 and 100 in said second grinding zone.

Advantageously, the rotor grinding surfaces 85 and 100 are both wholly positioned closer to the vertical axis of rotation 78 than an overall horizontal width "W" (FIG. 7) of 1.8 inches for keeping the relative speed between the opposed grinding surfaces 85 and 72, 100 and 80 within reasonable speed limits for avoiding undue heating effects. It will be appreciated that the larger the horizontal width "W" of the rotor 70, the greater will be its peripheral speed, and consequently the greater will be the grinding power being applied to the particulate food being ground at the normal rotational operating speed (about 1725 to 1750 RPM) of the tool drive means 24 of the food processor, and thus the greater will be the heating effect on the ground food product. These dimensions as specified provide a quick and effective and uniform grinding action while avoiding undue heating.

In operation grain, kernels, coffee beans, condiments or other dry particulate food which is to be ground is easily fed down into the hopper 32 after removing the cover 46. The particulate food passes by gravity down through the passageway 44 into the truncated conical chute 33 which directs the material to be ground down through the arcuate openings 54 into the first feeding-shearing/cracking-grinding zone 58. The partially ground product is then fed into the second grinding zone 81 above the rotating flared grinder section 95 by which the finished ground product or flour is distributed around uniformly into the bowl 12. The operation is clean, efficient and quick. For example, a full cup of hard durum wheat is ground into fine wheat flour in approximately 15 seconds.

Accordingly, with the grinding attachment 70 of the present invention the user may adapt a food processor at home for the preparation of a wide variety of food items, for example such as whole wheat flour for making bread or pancakes, etc. Employing the grinding attachment in the form shown utilizes the bowl, motor drive and toolshaft and base of a food processor, requiring no modifications thereof, which makes this attachment considerably less costly than providing an individual complete appliance for performing the described adjustable grinding operations.

Since other changes and modifications varied to fit particular operating requirements and environments will become recognized by those skilled in the art, the invention is not considered limited to the examples chosen for purposes of illustration, and includes all changes and modifications which do not constitute a departure from the true spirit and scope of this invention as claimed in the following claims and equivalents of the claimed elements.

What is claimed is:

1. Grinding apparatus for particulate food adapted to be mounted as an attachment on a food processor having a base containing a motor drive and tool drive means extending up vertically from the base into a bowl and being rotated by the motor drive, said food processor including actuatable control means for enabling the motor drive to be operated when said actuatable control means are actuated and for disabling the motor drive when said actuatable control means are not actuated, said grinding apparatus comprising:

mounting means for mounting said grinding apparatus on the bowl of the food processor in a predetermined position, said mounting means including an actuator for actuating said actuatable control means when said mounting means are mounted on the bowl in said predetermined position for enabling the motor drive to be operated when said mounting means are mounted on the bowl in said predetermined position, a grinding apparatus carried by said mounting means and having stator grinding means and rotor grinding means positioned coaxially with respect to each other, said rotor grinding means being rotatable about a vertical axis, said stator and rotor grinding means defining a downwardly extending convergent grinding zone therebetween, said grinding assembly carried by said mounting means being positioned about the bottom of said bowl when said mounting means are mounted on the bowl in said predetermined position, means for removably coupling said rotor grinding means to said tool drive means of the food processor for rotation thereby, and a hopper carried by said mounting means positioned above said grinding assembly for directing the particulate food to be ground down into said grinding zone between said stator and rotor grinding means of said grinding assembly, whereby said particulate food is ground by said grinding assembly and the ground food product is deposited into said bowl of the food processor.

2. The grinding apparatus for particulate food as claimed in claim 1, wherein:

said stator and rotor grinding means having opposed serrated surfaces defining a second grinding zone continuing from said downwardly extending convergent grinding zone for receiving partially ground particulate food from said convergent grinding zone, and said opposed serrated surfaces of said stator and rotor grinding means in said second grinding zone both flare outwardly from said vertical axis of rotation at about the same acute angle "E" to the horizontal in the range from about 5° to about 40° for distributing the ground product outwardly away from the vertical axis and uniformly around in said bowl.

3. The grinding apparatus for particulate food as claimed in claim 2, wherein:

the downwardly convergent grinding zone and the second grinding zone are both positioned closer to the vertical axis of rotation than an overall horizontal width of less than 1.8 inches for providing a quick, effective and uniform grinding action while avoiding undue heating at the normal rotational speed of the tool drive means of a food processor.

4. The grinding apparatus for particulate food as claimed in claim 2, in which:

said stator grinding means are mounted on the bottom of said hopper and encircle said rotor grinding means, said rotor grinding means have a vertical shaft extending along said vertical axis, manually operable adjustment means for changing the axial position of said vertical shaft for adjusting the vertical clearance between said opposed serrated surfaces in said second grinding zone at said acute angle "E" to the horizontal for controlling the fineness of the ground product being distributed from said grinding zone in to said bowl, and said means for removably coupling said rotor grinding means to said tool drive means accommodate the adjustment in axial position of said vertical shaft of the grinding means.

5. The grinding apparatus for particulate food as claimed in claim 4, wherein:

said downwardly extending convergent grinding zone is substantially vertical for maximizing the downward feeding effect of gravity on the particulate food in said convergent grinding zone, and said second grinding zone flares outwardly at more than an angular difference of 50° from said first zone for being more nearly horizontal rather than vertical for enabling relatively small adjustments in the relative axial position of the stator and rotor grinding means to effect significant changes in the clearance between the opposed serrated surfaces in said grinding zone.

6. The grinding apparatus for particulate food as claimed in claim 4, in which:

the bottom of said hopper has a downwardly convergent funnel configuration, and said stator grinding means defining a downwardly converging serrated grinding surface contiguous with the downwardly convergent bottom of the hopper for enabling gravity to smoothly feed particulate food downwardly from the bottom of the hopper into the grinding zone of said grinding assembly.

7. The grinding apparatus for particulate food as claimed in claim 1, in which:

said stator and rotor grinding means define a first grinding zone therebetween extending downwardly and converging downwardly, said stator and rotor grinding means also define a second grinding zone therebetween extending downwardly from the bottom of said first grinding zone, said second grinding zone also extending outwardly from the bottom of said first grinding zone away from said vertical axis of rotation, said stator and rotor grinding means including opposed serrations in said first and second grinding zones, the opposed serrations in said second grinding zones being finer than those in said first grinding zone, and said second grinding zone being open at its outward downward end for discharging the ground food product therefrom for dispersal down into said bowl.

8. The grinding apparatus for particulate food as claimed in claim 7, in which:
a plurality of the serrations in said first grinding zone are in the form of flutes having a helical configuration pitched in the direction for propelling the particulate food downwardly in said first grinding zone.

9. The grinding apparatus for particulate food as claimed in claim 8, in which:
said helical flutes are inclined to the horizontal at a screw pitch angle in the range from about 15° to about 40°.

10. The grinding apparatus for particulate food as claimed in claim 9, in which:
said helical flutes are inclined to the horizontal at a screw pitch angle of about 30°.

11. The grinding apparatus for particulate food as claimed in claim 8, in which:
the serrations opposed to said flutes have abrupt front faces facing toward the oncoming particulate food in said first grinding zone and have more gradual rear faces facing away from the oncoming particulate food, and
said abrupt front faces are sloped downwardly at a small acute angle to the vertical in the direction for applying a component of force acting downwardly on the oncoming particulate food in said first grinding zone for propelling the particulate food downwardly in said first zone.

12. The grinding apparatus for particulate food as claimed in claim 8, in which:
the serrations opposed to said flutes have abrupt front faces facing toward the oncoming particulate food in said first grinding zone and have more gradual rear faces facing away from the oncoming particulate food,
the successive serrations define a groove between the abrupt front face of a serration and the more gradual rear face of the preceding serration, and
the angle between each such abrupt front face and the more gradual rear face is in the range from about 60° to about 80°.

13. The grinding apparatus for particulate food as claimed in claim 12, in which:
said angle between each such abrupt front face and the more gradual rear face of the preceding serration is about 75°.

14. The grinding apparatus for particulate food as claimed in claim 7, in which:
said rotor grinding means are adjustable in axial position with respect to said mounting means for adjusting the clearance between the opposed serrations in said second grinding zone for controlling the fineness of the ground food product discharged from the outward downward end of said second grinding zone, and
manually operable adjustment means for changing the axial position of said rotor grinding means relative to said mounting means.

15. The grinding apparatus for particulate food as claimed in claim 1, in which:
a vertical tubular support is positioned in said hopper aligned with said vertical axis of rotation,
a plurality of support ribs extend between said tubular support and said hopper with openings between said ribs leading downwardly from said hopper into said downwardly convergent grinding zone,
bearing means in said tubular support for rotatably mounting said rotor means, and
adjustment means for adjusting the axial position of said bearing means relative to said tubular support for controlling the fineness of the ground food product.

16. The grinding apparatus for particulate food as claimed in claim 15, in which:
said adjustment means is mounted in said tubular support for adjusting the axial position of said bearing means for adjusting the axial position of the rotor means relative to the stator means for controlling the fineness of the ground food product.

17. The grinding apparatus for particulate food as claimed in claim 16, in which:
said adjustment means includes a manually operable screw threaded section within said tubular support, and
manually operable lock nut means for securing the adjusted position of said screw threaded section.

18. The grinding apparatus for particulate food as claimed in claim 16, in which:
a tubular housing is concentrically positioned within said tubular support,
said tubular housing being in screw threaded engagement with the tubular support and being adjustable in axial position relative to said tubular support by manually turning said tubular housing,
said bearing means being held in said tubular housing, and
manually operable locking means for releasably locking said tubular housing for preventing its turning relative to said tubular support for releasably securing the adjusted position of said tubular housing.

19. The grinding apparatus for particulate food as claimed in claim 18, in which:
said bearing means include a pair of axially spaced ball bearing units of the same size axially aligned, being an upper unit above a lower unit,
said upper and lower ball bearing units each including an inner and an outer race,
bearing mounting means in said tubular support imposing axial preloading forces in opposite directions on the inner and outer races of the lower ball bearing unit and imposing axial preloading forces of similar magnitude in opposite directions on the inner and outer races of the upper ball bearing unit, and
said axial preloading forces being in opposite directions on the inner races of both bearing units and also being in opposite directions on the outer races of both bearing units for preventing chattering of said bearing units when rotated at the normal rotational speed of said tool drive means.

20. Particulate food grinding apparatus adapted to be mounted on a food processor having a base containing a motor drive and tool drive means extending up vertically into a bowl seated on said base, and rotated about a vertical axis in said bowl by said motor drive, the food processor including interlock switch means for preventing operation of the motor drive unless said interlock switch means are actuated, said particulate food grinding apparatus comprising:
mounting means for mounting the apparatus on the bowl of a food processor in a predetermined position on said bowl,
said mounting means carrying actuation means for actuating said interlock switch means for enabling the motor drive to be operated when the mounting means are mounted on the bowl in said predetermined position, a hopper carried by said mounting means and having at least one outlet in the bottom, said hopper being adapted to have particulate food introduced therein, a grinding assembly carried by said mounting means and being positioned below the outlet in the bottom of said hopper, said grinding assembly including rotor grinding means and bearing means for said rotor grinding means providing a vertical axis of rotation for said rotor grinding means, said grinding assembly including stator grinding means coaxial with said rotor grinding means, coupling means connected to said rotor grinding means for releasably coupling said rotor grinding means to said tool drive means extending up vertically into the bowl when said mounting means are mounted on the bowl of a food processor in said predetermined position thereon, said rotor and stator grinding means defining a downwardly convergent grinding zone communicating with the outlet in the bottom of the hopper, said downwardly convergent grinding zone having an open discarge end for discharging ground particulate food therefrom into said bowl, and said grinding assembly also including adjustment means for adjusting the relative axial position of the stator and rotor grinding means for controlling the fineness of the ground particulate food being discharged from the open discharge end of the grinding zone.

21. The particulate food grinding apparatus as claimed in claim 20, in which:
said hopper has a tubular support extending upwardly therein,
a plurality of reinforcing ribs extend between said tubular support and said hopper with openings between said ribs leading downwardly from said hopper into said grinding assembly, and
said bearing means is held within said tubular support.

22. The particulate food grinding apparatus as claimed in claim 21, in which:
said hopper has a pedestal on the bottom thereof extending around said openings between said ribs, and
said stator grinding means is secured to said pedestal.

23. The particulate food grinding apparatus as claimed in claim 20, in which:
said rotor grinding means include a first section having helical serrations thereon for propelling particulate food downwardly in said downwardly convergent grinding zone,
said rotor grinding means includes a second section positioned below said first section,
said second rotor grinding section flares generally radially outwardly,
said second section of said rotor grinding means and said stator grinding means have opposed closely spaced grinding surfaces defining a second grinding zone communicating with said open discharge end of said downwardly convergent grinding zone for receiving partially ground particulate food therefrom, and
said second grinding zone is open at the perimeter thereof for distributing the fully ground particulate food from the second grinding zone into a bowl below said grinding assembly.

24. The particulate food grinding apparatus as claimed in claim 23, which:
said hopper has a tubular support extending upwardly therein,
a plurality of reinforcing ribs extend between said tubular support and said hopper with openings between said ribs leading downwardly from said hopper into said grinding assembly,
said bearing means are held within said tubular support,
adjustment means are provided for adjusting the vertical axial position of said bearing means within said tubular support for adjusting the vertical position of the rotor grinding means for adjusting the clearance between said closely spaced opposed grinding surfaces in said second grinding zone for controlling the fineness of the ground particulate food distributed from the perimeter of said second grinding zone into the bowl.

25. The particulate food grinding apparatus as claimed in claim 23, in which:
said downwardly convergent grinding zone and said second grinding zone are both positioned closer to said vertical axis of rotation than an overall horizontal width of 1.8 inches.

26. The particulate food grinding apparatus as claimed in claim 23, in which:
said opposed closely spaced grinding surfaces which define said second grinding zone each include numerous sawtooth shape serrations,
each of said ridge serrations including an abrupt front face facing toward the oncoming particulate food and a gradual rear face facing away from the oncoming particulate food, and
said abrupt faces of said ridge serrations being angled with respect to the direction of rotation for exerting a component of force toward the open perimeter of said second grinding zone on the particulate food being ground therein.

27. The particulate food grinding means as claimed in claim 20, wherein:
said hopper includes an upper cylindrical portion and a lower funnel chute portion converging downwardly toward said outlet in the bottom, and
said mounting means for mounting said food grinding apparatus on a food processor comprises a mounting skirt encircling the hopper and being attached to the hopper at the juncture of its upper cylindrical portion and its lower chute portion, said mounting skirt being adapted to be fastened onto a rim of a bowl of a food processor and including means for actuating a motor drive safety interlock of a food processor.

* * * * *